US011561755B2

(12) United States Patent
Locascio et al.

(10) Patent No.: US 11,561,755 B2
(45) Date of Patent: Jan. 24, 2023

(54) METHOD, APPARATUS, AND COMPUTER PROGRAM PRODUCT FOR SHARING INTERFACE ANNOTATIONS AMONG PARTICIPATING DEVICES WITHIN A GROUP-BASED COMMUNICATION SYSTEM

(71) Applicant: Slack Technologies, LLC, San Francisco, CA (US)

(72) Inventors: Andrew Locascio, San Francisco, CA (US); Jahanzeb Sherwani, San Francisco, CA (US); Hubert Florin, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 96 days.

(21) Appl. No.: 17/141,168

(22) Filed: Jan. 4, 2021

(65) Prior Publication Data
US 2021/0124550 A1 Apr. 29, 2021

Related U.S. Application Data

(63) Continuation of application No. 16/158,383, filed on Oct. 12, 2018, now Pat. No. 10,884,693.
(Continued)

(51) Int. Cl.
*G06F 3/14* (2006.01)
*H04L 12/18* (2006.01)
(Continued)

(52) U.S. Cl.
CPC .......... *G06F 3/1462* (2013.01); *G06F 3/0484* (2013.01); *G06F 40/169* (2020.01);
(Continued)

(58) Field of Classification Search
CPC .... G06F 3/1462; G06F 3/0484; G06F 40/169; G06Q 10/101; G06T 11/60; H04L 12/1831; H04L 12/1822; G09G 2354/00
See application file for complete search history.

(56) References Cited

U.S. PATENT DOCUMENTS 9,652,743 B2    5/2017 Zhu
2011/0154192 A1  6/2011 Yang et al.
(Continued)

OTHER PUBLICATIONS

"Die, Email, Die! A Flickr Cofounder Aims To Cut US All Some Slack", ReadWriteWeb, LexisNexis, www.advance.lexis.com/api/permalink/33dd79e2-90f5-409d-ae27-5a2c7e86bf31/?context=1000516. (dated Aug. 14, 2013, 4:15 PM) 2 pages.
(Continued)

*Primary Examiner* — Sm A Rahman
(74) *Attorney, Agent, or Firm* — Holland & Hart LLP

(57) ABSTRACT

Embodiments of the present disclosure provide methods, systems, apparatuses, and computer program products for sharing a shared interface and allowing participants to annotate the shared interface within a group-based communication system. A shared interface is shared by an interface sharing device to participating devices, which can then individually annotate the shared interface by creating interface annotations that then are shared on the shared interface by the interface sharing device. Such methods, systems, apparatuses, and computer program products provide for an efficient and effective method of advancing discussions among a group in a group-based communication system.

17 Claims, 10 Drawing Sheets

Related U.S. Application Data

(60) Provisional application No. 62/572,181, filed on Oct. 13, 2017.

(51) Int. Cl.
  G06F 3/0484 (2022.01)
  G06T 11/60 (2006.01)
  G06Q 10/10 (2012.01)
  G06F 40/169 (2020.01)

(52) U.S. Cl.
  CPC ............ G06Q 10/101 (2013.01); G06T 11/60 (2013.01); H04L 12/1831 (2013.01); *G09G 2354/00* (2013.01)

(56) References Cited

U.S. PATENT DOCUMENTS

| | | | |
|---|---|---|---|
| 2014/0292999 A1 | 10/2014 | Do et al. | |
| 2017/0201553 A1* | 7/2017 | Hong | .................... H04L 65/403 |
| 2017/0336960 A1* | 11/2017 | Chaudhri | ......... H04N 5/232933 |
| 2018/0137666 A1* | 5/2018 | Steiner | .................... G06T 11/60 |
| 2018/0287982 A1 | 10/2018 | Draeger et al. | |
| 2018/0331842 A1* | 11/2018 | Faulkner | .................. H04N 7/15 |

OTHER PUBLICATIONS

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email", Atlantic Online, LexisNexis, www.advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.

Ernie Smith, "Picking Up The Slack", Tedium, [online][retrieved May 9, 2019]. Retrieved from the Internet: www.tedium.co/2017/10/17/irc-vs-slack-chat-history/. (dated Oct. 17, 2017) 13 pages.

Internet Relay Chat, Wikipedia, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", Gigaom, LexisNexis, www.advance.lexis.com/api/permalink/e83778c8-09c8-43aa-9ba0-88526283de69/?context=1000516, (dated Aug. 1, 2014, 5:45 PM) 4 pages.

Locascio et al., U.S. Office Action dated Dec. 11, 2019 directed to U.S. Appl. No. 16/158,383; 10 pages.

Locascio et al., U.S. Office Action dated May 14, 2020 directed to U.S. Appl. No. 16/158,383; 13 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, LexisNexis, www.advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PandoDaily, LexisNexis, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, Is Valued at $1.1 Billion", The New York Times Blogs (BITS), LexisNexis, www.advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: www.rfc-editor.org/rfc/rfc1459.txt. (dated May 1993) 57 pages.

Rebecca Walberg, "Email biggest office waste of time: survey", National Post, At FP10, LexisNexis, www.advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

* cited by examiner

METHOD, APPARATUS, AND COMPUTER PROGRAM PRODUCT FOR SHARING INTERFACE ANNOTATIONS AMONG PARTICIPATING DEVICES WITHIN A GROUP-BASED COMMUNICATION SYSTEM

CROSS-REFERENCE TO RELATED APPLICATIONS

This application is a continuation of U.S. application Ser. No. 16/158,383, filed on Oct. 12, 2018, which claims priority to and the benefit of U.S. Provisional Patent Application Ser. No. 62/572,181, entitled "Method, Apparatus, and Computer Program Product for Sharing Interface Annotations among Participating Devices within a Group-Based Communication System" and filed on Oct. 13, 2017, the entire contents of which are hereby incorporated by reference.

BACKGROUND

An enterprise may provide for collaboration among client devices, including via messaging, audio calls, and video conference calls. Applicant has identified a number of deficiencies and problems associated with sharing content efficiently and effectively in audio and video conferences calls. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for sharing interface annotations to a shared interface of a group-based communication interface among a plurality of participating devices in a group-based communication system. In some embodiments, methods are provided for sharing interface annotations to a shared interface of a group-based communication interface among a plurality of participating devices in a group-based communication system, each of the participating devices having a display configured to render the shared interface of the group-based communication interface, the method may include causing the shared interface to be rendered on respective displays of the plurality of participating devices; receiving a first set of display input data from a first annotating device of a plurality of participating devices; generating a first set of interface annotation instructions based on the received first set of display input data; and outputting the first set of interface annotation instructions to the plurality of participating devices for rending as a first interface annotation on the shared interface of the group-based communication interface.

In some embodiments, the first set of interface annotation instructions may be associated with a layer of the shared interface, the layer being associated with the first annotating device that originated the first set of display input data. In some embodiments, the first set of interface annotation instructions may be outputted to each of the plurality of participating devices except for the first annotating device that originated the first display input data. In some embodiments, the method may further include receiving a second set of display input data from the first annotating device or a second annotating device of the plurality of participating devices; generating a second set of interface annotation instructions based on the received second set of display input data; and outputting the second set of interface annotation instructions to the plurality of participating devices for rending a second interface annotation on the shared interface of the group-based communication interface.

In some embodiments, the first interface annotation may be rendered on the shared interface for a predetermined period of time after which the first interface annotation is removed from viewing on the shared interface.

In some embodiments, the method may further include receiving a second set of display input data from the first annotating device or a second annotating device of the plurality of participating devices within a predetermined time period following receipt of the first set of display input data; generating a second set of interface annotation instructions based on the received second set of display input data; and outputting the second set of interface annotation instructions to the plurality of participating devices for rending a second interface annotation along with the first interface annotation on the shared interface of the group-based communication interface.

In some embodiments, the method may further include associating the first set of display input data with an intended set of display input data, generating the first set of interface annotation instructions based on the intended set of display input data and the first set of display input data; wherein the intended set of display input data causes the first interface annotation to have at least one of a higher quality, clarity, or aesthetic appearance than the first interface annotation not based on the intended set of display input data.

In some embodiments, the first display input data may relate to at least one of an emoji, image, illustration, highlight, underline, shape, or combination thereof. In some embodiments, the method may further include recording a time of receipt of the first set of display input data.

In some embodiments, the first interface annotation may be rendered with a participating device identifier.

Embodiments of the present disclosure are also directed to an apparatus for sharing interface annotations to a shared interface of a group-based communication interface among a plurality of participating devices in a group-based communication system. In some embodiments, the apparatus may be provided for sharing interface annotations to a shared interface of a group-based communication interface among a plurality of participating devices in a group-based communication system, each of the participating devices having a display configured to render the shared interface of the group-based communication interface, the apparatus may include at least one processor and at least one memory including computer program code, the at least one memory and computer program code configured to, with the at least one processor, cause the apparatus to: cause the shared interface to be rendered on respective displays of the plurality of participating devices; receive a first set of display input data from a first annotating device of the plurality of participating devices; generate a first set of interface annotation instructions based on the received first set of display input data; and output the first set of interface annotation instructions to the plurality of participating devices for rending as a first interface annotation on the shared interface of the group-based communication interface. In some embodiments, the first set of interface annotation instructions may be associated with a layer of the shared interface, the layer being associated with the first annotating device that originated the first set of display input data.

In some embodiments, the at least one memory and computer program code may be configured to, with the at least one processor, cause the apparatus to: output the first set of interface annotation instructions to each of the plurality of participating devices except for the first annotating device that originated the first display input data.

In some embodiments, the at least one memory and computer program code may further be configured to, with the at least one processor, cause the apparatus to: receive a second set of display input data from the first annotating device or a second annotating device of the plurality of participating devices; generate a second set of interface annotation instructions based on the received second set of display input data; and output the second set of interface annotation instructions to the plurality of participating devices for rending a second interface annotation on the shared interface of the group-based communication interface.

In some embodiments, the first interface annotation may be rendered on the shared interface for a predetermined period of time after which the first interface annotation is removed from viewing on the shared interface.

In some embodiments, the at least one memory and computer program code may further be configured to, with the at least one processor, cause the apparatus to: receive a second set of display input data from the first annotating device or a second annotating device of the plurality of participating devices within a predetermined time period following receipt of the first set of display input data; generate a second set of interface annotation instructions based on the received second set of display input data; and output the second set of interface annotation instructions to the plurality of participating devices for rending a second interface annotation along with the first interface annotation on the shared interface of the group-based communication interface.

In some embodiments, the at least one memory and computer program code may further be configured to, with the at least one processor, cause the apparatus to: associate the first set of display input data with an intended set of display input data, generate the first set of interface annotation instructions based on the intended set of display input data and the first set of display input data, wherein the intended set of display input data causes the first interface annotation to have at least one of a higher quality, clarity, or aesthetic appearance than the first interface annotation not based on the intended set of display input data.

In some embodiments, the first display input data may relate to at least one of an emoji, image, illustration, highlight, underline, shape, or combination thereof.

In some embodiments, the at least one memory and computer program code may further be configured to, with the at least one processor, cause the apparatus to record a time of receipt of the first set of display input data.

In some embodiments, the first interface annotation may be rendered with a participating device identifier.

Embodiments of the present disclosure are also directed to methods of sharing interface annotations to a shared interface of a group-based communication interface among a plurality of participating devices in a group-based communication system, each of the participating devices having a display configured to render the shared interface of the group-based communication interface. In some embodiments, the method may include receiving the shared interface to be rendered on respective displays of the participating devices; creating a first interface annotation on the shared interface while the shared interface is shared among the plurality of participating devices, the first interface annotation generating a first set of display input data; and causing the first set of display input data to be transmitted to an interface sharing device of which the shared interface originated, wherein a first interface annotation instructions are generated by the interface sharing device and outputted to the plurality of participating devices for rendering as the first interface annotation on the shared interface of the group-based communication interface.

In some embodiments, the first set of interface annotation instructions may be associated with a layer of the shared interface, the layer being associated with the annotating device that originated the first set of display input data.

In some embodiments, the first set of interface annotation instructions may be outputted to each of the plurality of participating devices except for the annotating device that originated the first display input data. In some embodiments, the method may further include creating a second interface annotation on the shared interface while the shared interface is shared among the plurality of participating devices, the second interface annotation generating a second set of display input data; and causing the second set of display input data to be transmitted to the interface sharing device of which the shared interface originated, wherein a second set of interface annotation instructions are generated by the interface sharing device and outputted to the plurality of participating devices for rendering as the second interface annotation on the shared interface of the group-based communication interface.

In some embodiments, the first interface annotation may be rendered on the shared interface for a predetermined period of time after which the first interface annotation is removed from viewing on the shared interface.

In some embodiments, the method may further include creating a second interface annotation on the shared interface while the shared interface is shared among the plurality of participating devices within a predetermined time period following creation of the first interface annotation, the second interface annotation generating a second set of display input data; and causing the second set of display input data to be transmitted to the interface sharing device of which the shared interface originated, wherein a second set of interface annotation instructions are generated by the interface sharing device and outputted to the plurality of participating devices for rendering as the second interface annotation along with the first interface annotation on the shared interface of the group-based communication interface.

In some embodiments, the first set of display input data may be associated with an intended set of display input data and the first set of interface annotation instructions are generated based on the intended set of display input data and the first set of display input data, wherein the intended set of display input data causes the first interface annotation to have at least one of a higher quality, clarity, or aesthetic appearance than the first interface annotation not based on the intended set of display input data.

In some embodiments, the first display input data may relate to at least one of an emoji, image, illustration, highlight, underline, shape, or combination thereof. In some embodiments, a time of receipt of the first set of display input data by the interface sharing device may be recorded. In some embodiments, the first interface annotation may be rendered with a participating device identifier.

Embodiments provided herein also relate to an apparatus for sharing interface annotations to a shared interface of a group-based communication interface among a plurality of devices in a group-based communication system, each of the participating devices having a display configured to render the shared interface of the group-based communication interface, the apparatus may include at least one processor and at least one memory including computer program code, the at least one memory and computer program code configured to, with the at least one processor, cause the apparatus to: receive the shared interface to be rendered on respective displays of the participating devices; create a first interface annotation on the shared interface while the shared interface is shared among the plurality of participating devices, the first interface annotation generating a first set of display input data; and cause the first set of display input data to be transmitted to an interface sharing device of which the shared interface originated, wherein a first interface annotation instructions are generated by the interface sharing device and outputted to the plurality of participating devices for rendering as the first interface annotation on the shared interface of the group-based communication interface.

In some embodiments, the first set of interface annotation instructions may be associated with a layer of the shared interface, the layer being associated with the annotating device that originated the first set of display input data. In some embodiments, the first set of interface annotation instructions may be outputted to each of the plurality of participating devices except for the annotating device that originated the first display input data.

In some embodiments, the at least one memory and computer program code may further be configured to, with the at least one processor, cause the apparatus to: create a second interface annotation on the shared interface while the shared interface is shared among the plurality of participating devices, the second interface annotation generating a second set of display input data; and cause the second set of display input data to be transmitted to the interface sharing device of which the shared interface originated, wherein a second set of interface annotation instructions are generated by the interface sharing device and outputted to the plurality of participating devices for rendering as the second interface annotation on the shared interface of the group-based communication interface.

In some embodiments, the first interface annotation may be rendered on the shared interface for a predetermined period of time after which the first interface annotation is removed from viewing on the shared interface. In some embodiments, the at least one memory and computer program code may further be configured to, with the at least one processor, cause the apparatus to: create a second interface annotation on the shared interface while the shared interface is shared among the plurality of participating devices within a predetermined time period following creation of the first interface annotation, the second interface annotation generating a second set of display input data; and cause the second set of display input data to be transmitted to the interface sharing device of which the shared interface originated, wherein a second set of interface annotation instructions are generated by the interface sharing device and outputted to the plurality of participating devices for rendering as the second interface annotation along with the first interface annotation on the shared interface of the group-based communication interface.

In some embodiments, the first set of display input data may be associated with an intended set of display input data and the first set of interface annotation instructions are generated based on the intended set of display input data and the first set of display input data, wherein the intended set of display input data causes the first interface annotation to have at least one of a higher quality, clarity, or aesthetic appearance than the first interface annotation not based on the intended set of display input data.

In some embodiments, the first display input data may relate to at least one of an emoji, image, illustration, highlight, underline, shape, or combination thereof. In some embodiments, a time of receipt of the first set of display input data by the interface sharing device may be recorded. In some embodiments, the first interface annotation may be rendered with a participating device identifier.

Embodiments provided herein also relate to a method of sharing interface annotations to a shared interface among a plurality of participating devices in a system, each of the participating devices having a display configured to render the shared interface. In some embodiments, the method may include causing the shared interface to be rendered on respective displays of the plurality of participating devices; receiving a first set of display input data from a first annotating device of a plurality of participating devices; generating a first set of interface annotation instructions based on the received first set of display input data; and outputting the first set of interface annotation instructions to the plurality of participating devices for rending as a first interface annotation on the shared interface.

In some embodiments, the first set of interface annotation instructions may be associated with a layer of the shared interface, the layer being associated with the first annotating device that originated the first set of display input data. In some embodiments, the first set of interface annotation instructions may be outputted to each of the plurality of participating devices except for the first annotating device that originated the first display input data. In some embodiments, the method may further include receiving a second set of display input data from the first annotating device or a second annotating device of the plurality of participating devices; generating a second set of interface annotation instructions based on the received second set of display input data; and outputting the second set of interface annotation instructions to the plurality of participating devices for rending a second interface annotation on the shared interface. In some embodiments, the first interface annotation may be rendered on the shared interface for a predetermined period of time after which the first interface annotation is removed from viewing on the shared interface.

In some embodiments, the method may further include receiving a second set of display input data from the first annotating device or a second annotating device of the plurality of participating devices within a predetermined time period following receipt of the first set of display input data; generating a second set of interface annotation instructions based on the received second set of display input data; and outputting the second set of interface annotation instructions to the plurality of participating devices for rending a second interface annotation along with the first interface annotation on the shared interface.

In some embodiments, the method may further include associating the first set of display input data with an intended set of display input data, generating the first set of interface annotation instructions based on the intended set of display input data and the first set of display input data; wherein the intended set of display input data causes the first interface annotation to have at least one of a higher quality, clarity, or aesthetic appearance than the first interface annotation not based on the intended set of display input data.

In some embodiments, the first display input data may relate to at least one of an emoji, image, illustration, highlight, underline, shape, or combination thereof. In some embodiments, the method may further include recording a time of receipt of the first set of display input data. In some embodiments, the first interface annotation may be rendered with a participating device identifier.

Other embodiments include corresponding systems, methods, and computer programs, configured to perform the operations of the apparatus, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
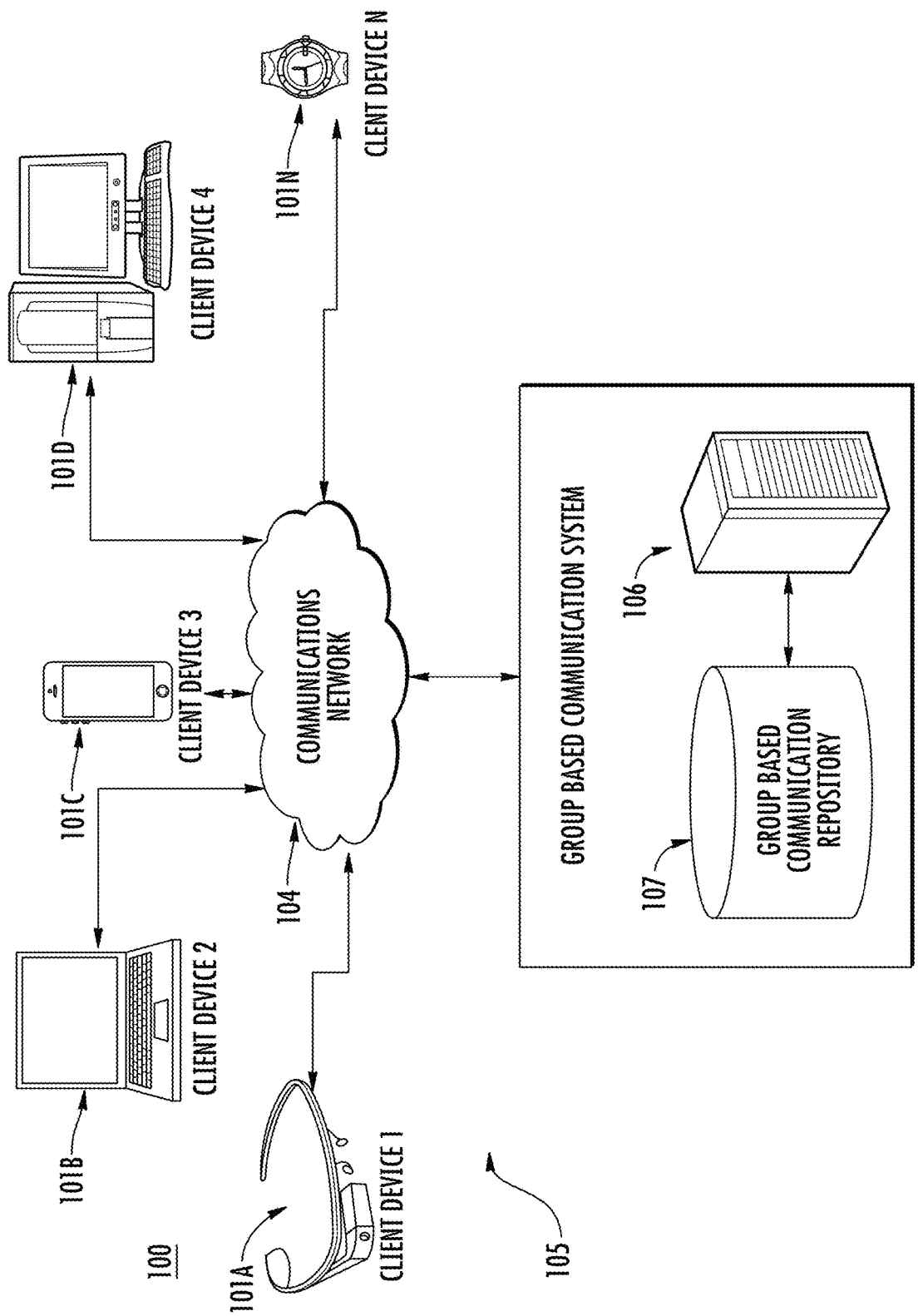
Figure 2:
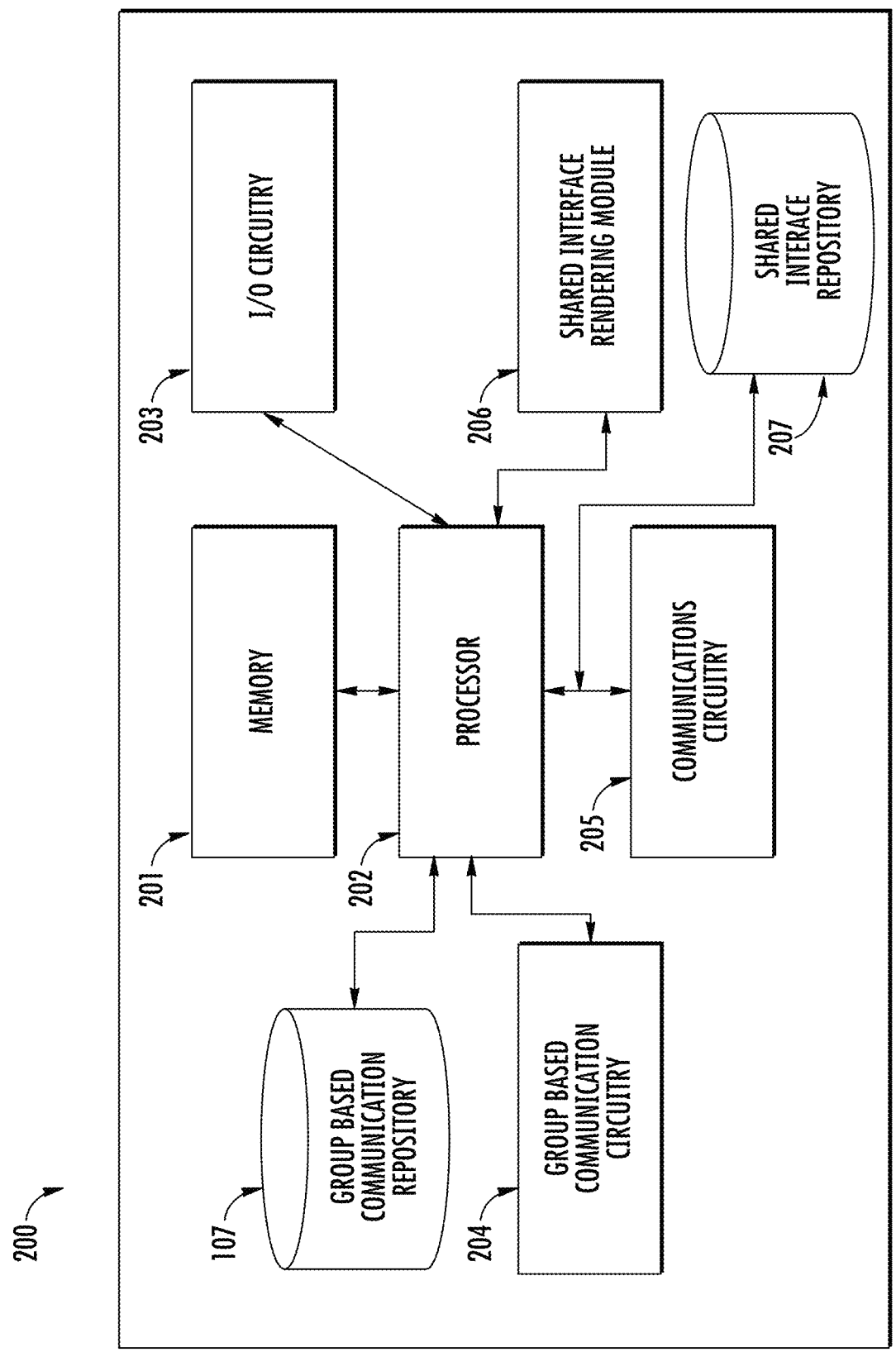
Figure 3:
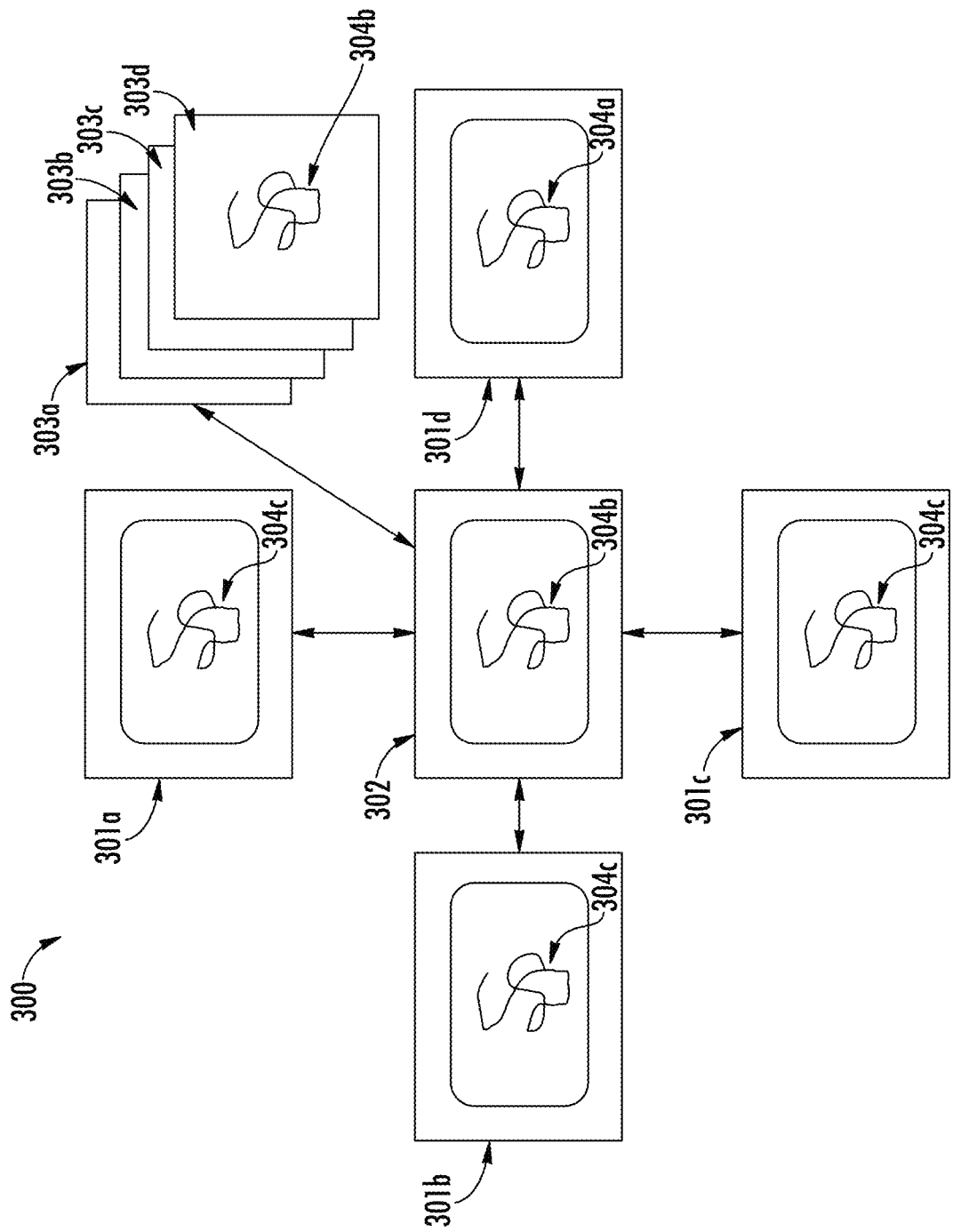
Figure 4:
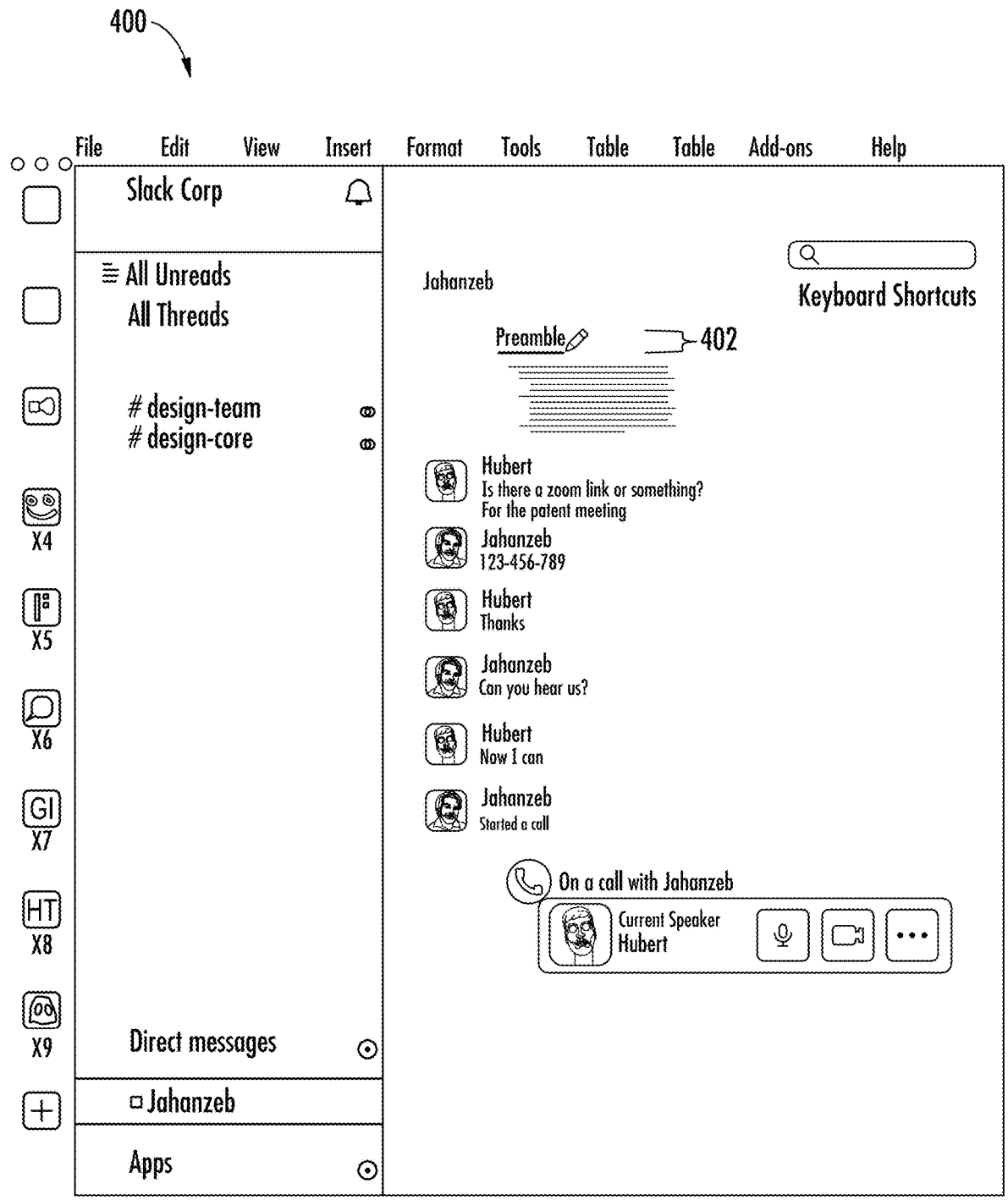
Figure 5:
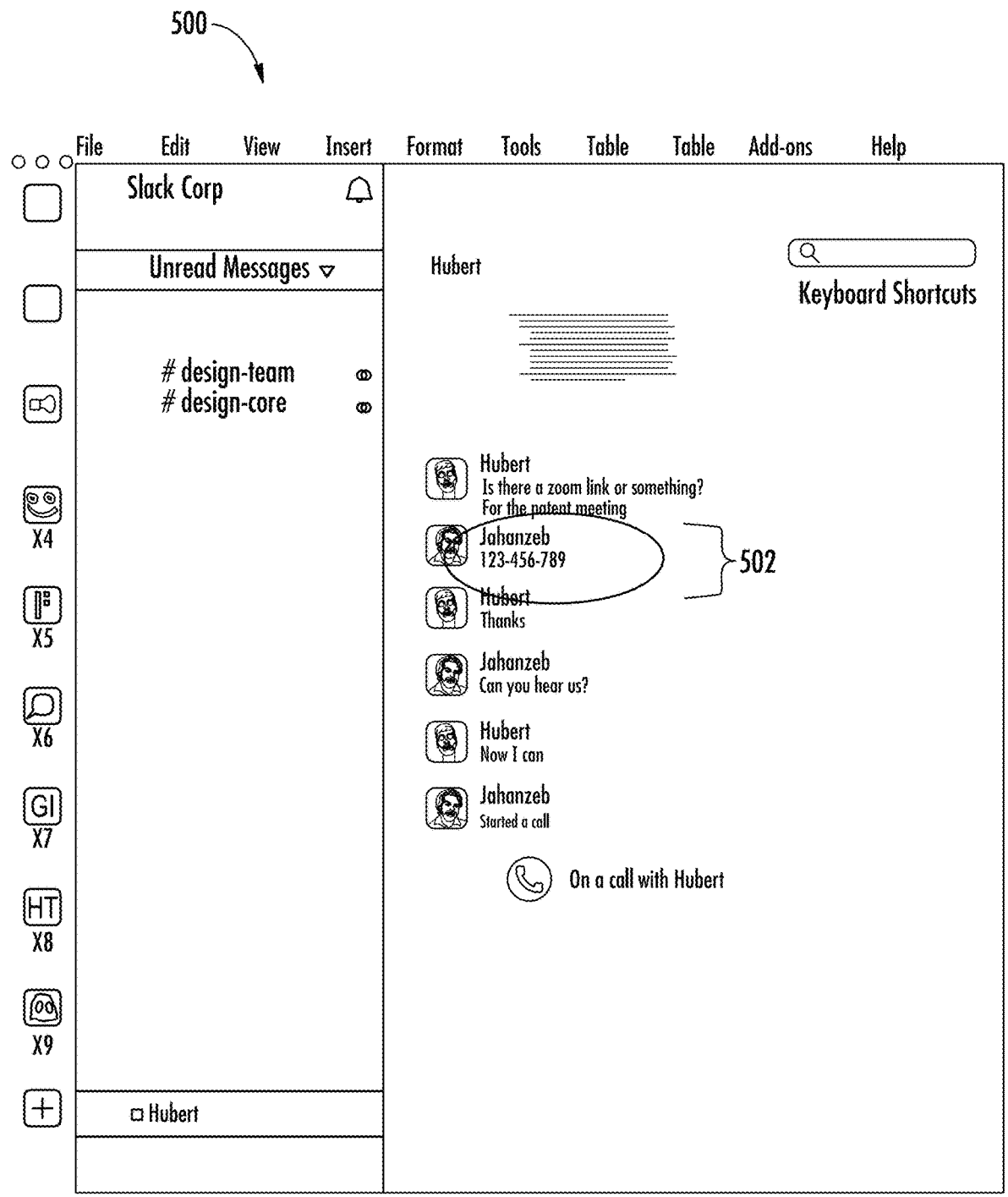
Figure 6:
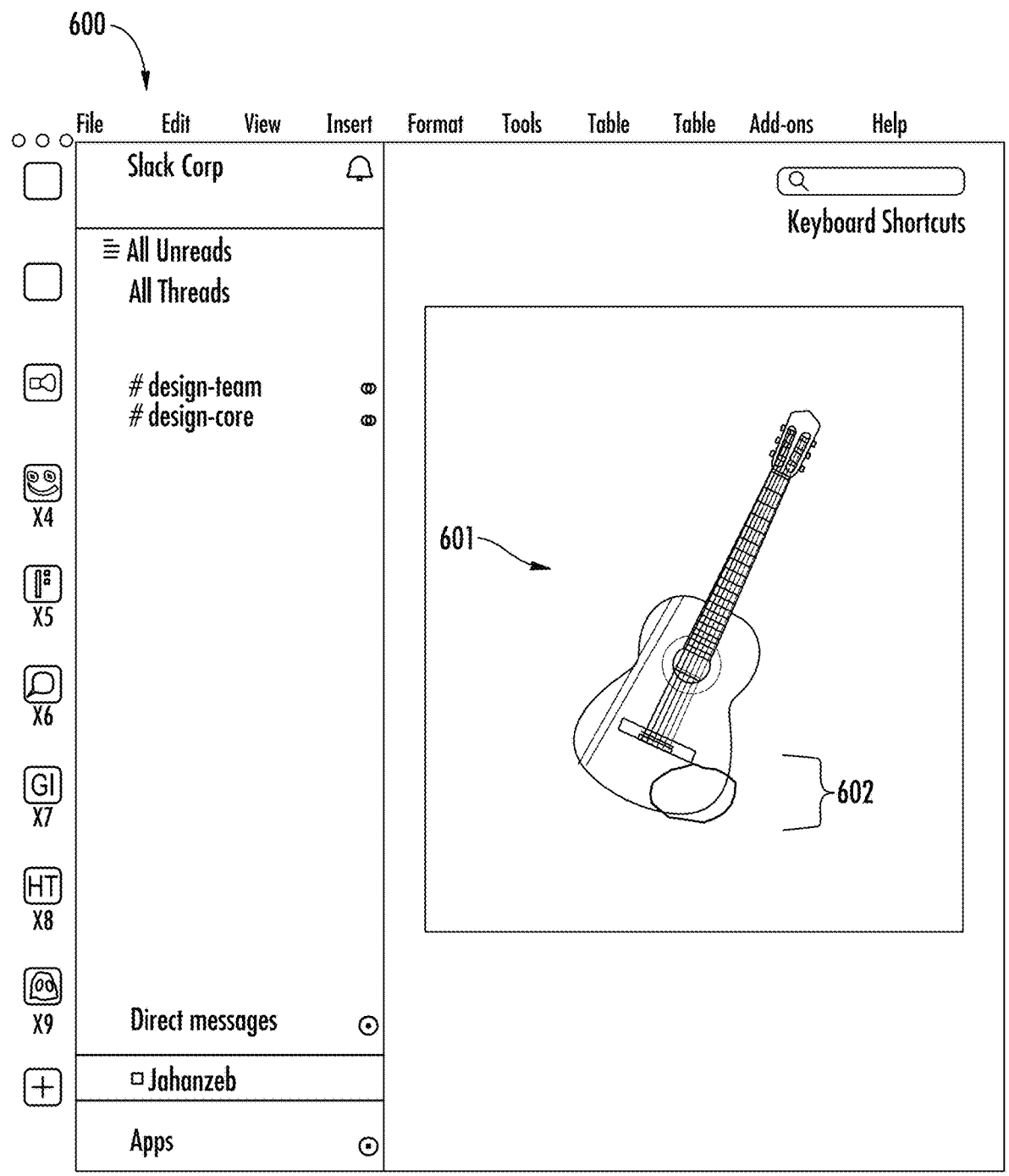
Figure 7:
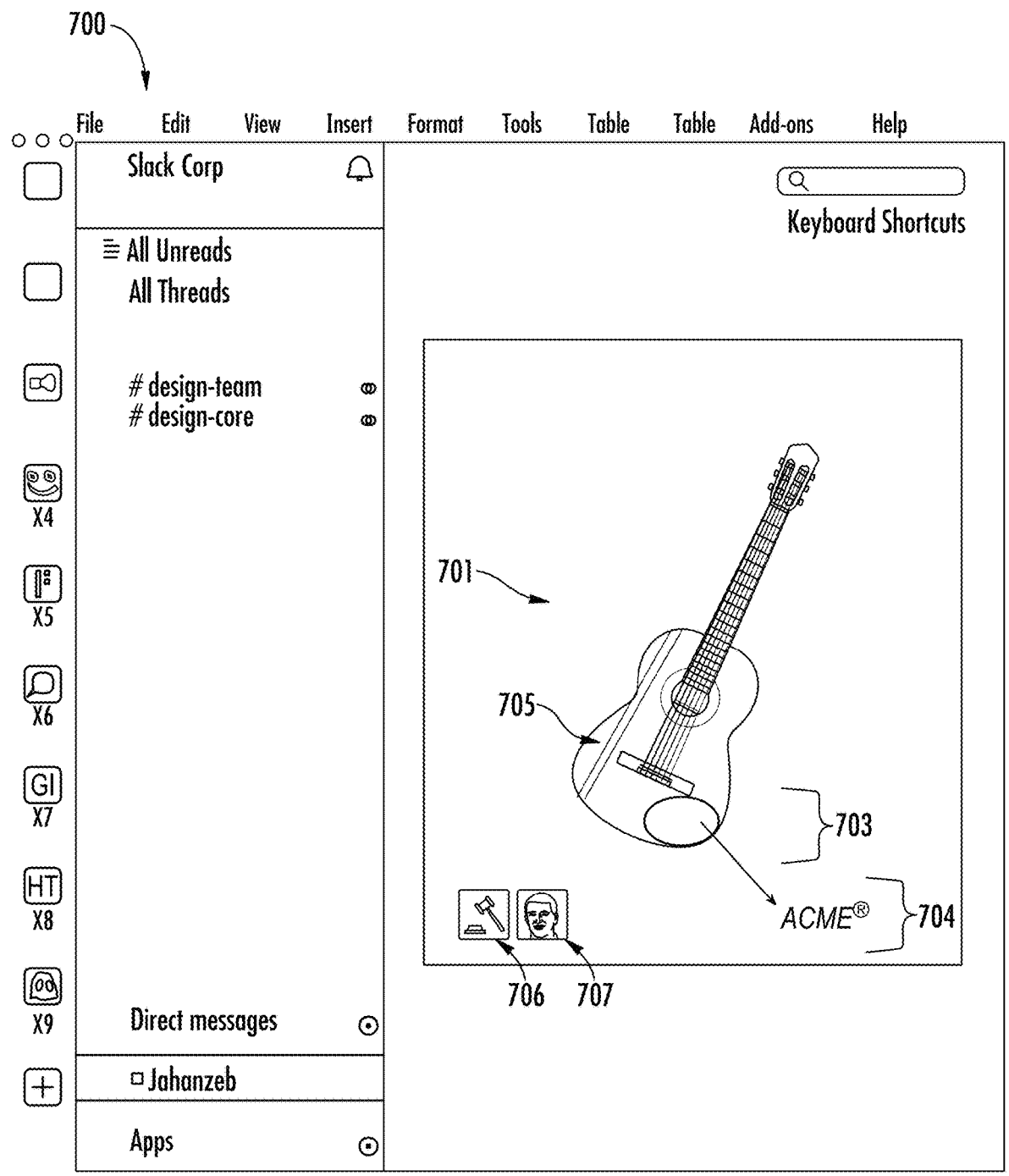
Figure 8:
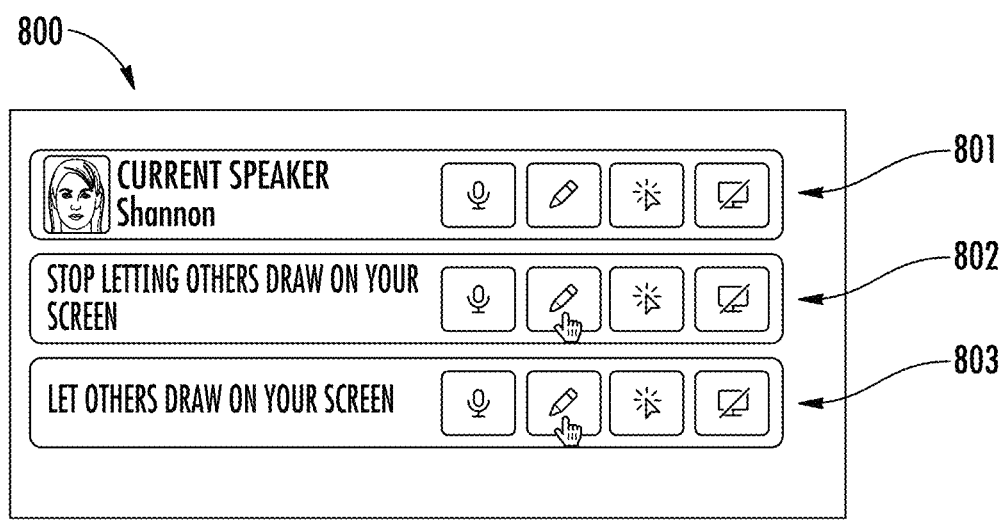
Figure 9:
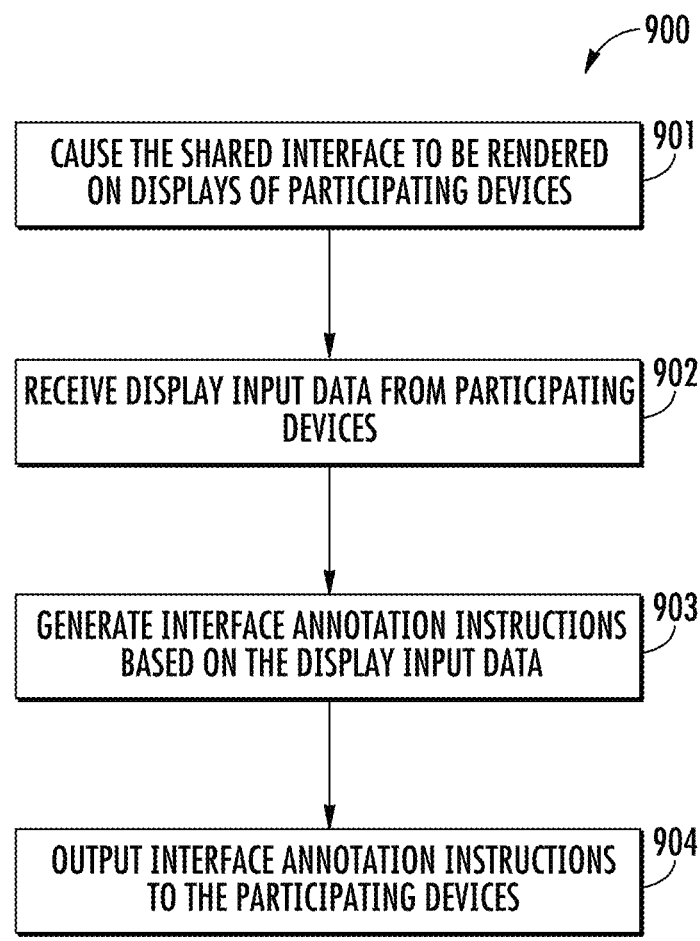
Figure 10:
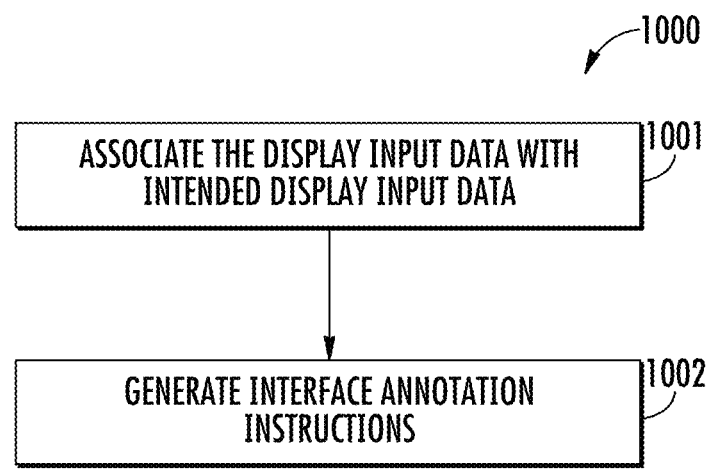
Figure 11:
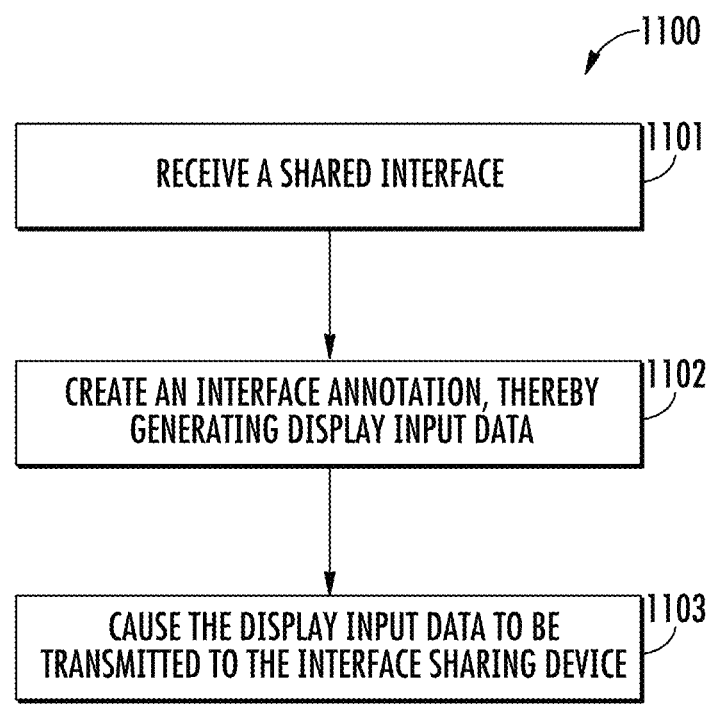

Having thus described the disclosure in general terms, reference will now be made to the accompanying drawings, which are not necessarily drawn to scale, and wherein:

FIG. 1 is a system architecture diagram of an exemplary group-based communication system configured to practice embodiments of the present disclosure;

FIG. 2 is an exemplary schematic diagram of a computing entity according to one embodiment of the present disclosure;

FIG. 3 illustrates an exemplary system for sharing interface annotations according to one embodiment of the present disclosure;

FIG. 4 illustrates an exemplary group-based communication interface according to one embodiment of the present disclosure;

FIG. 5 illustrates an exemplary group-based communication interface according to one embodiment of the present disclosure;

FIG. 6 illustrates an exemplary group-based communication interface according to one embodiment of the present disclosure;

FIG. 7 illustrates an exemplary group-based communication interface according to one embodiment of the present disclosure;

FIG. 8 illustrates an exemplary group-based communication interface according to one embodiment of the present disclosure;

FIG. 9 is a flowchart illustrating operations that are executed by an exemplary group-based communication system for sharing interface annotations according to one embodiment of the present disclosure;

FIG. 10 is a flowchart illustrating operations that are executed by an exemplary group-based communication system for sharing interface annotations according to one embodiment of the present disclosure; and FIG. 11 illustrates is a flowchart illustrating operations that are executed by an exemplary group-based communication system for sharing interface annotations according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to sharing interface annotations among participating devices within a group-based communication system.

Members of a group-based communication system routinely use group-based audio and/or video connections as well as in-person meetings to collaborate. During such meetings, it is often useful to share screens among participants such that each participant can view relevant information, e.g., presentations, papers, graphics, source code, or the like, for discussion. As meetings proceed and discussions develop, participants may desire to point to, highlight, or otherwise emphasize portions of the presentation, paper, graphic, etc. However, participants other than the host sharing his screen are conventionally unable to do so. Current attempts to work around, rather than technologically address, this problem such as passing host sharing responsibility among participants have proven to be inefficient, error prone, and frustrating.

Provided herein are methods and systems for effectively and efficiently sharing interface annotations among participating devices in a group-based communication system. While a select interface (the "shared interface") is being shared among participating devices such that each participating device can view the intended display, participating devices can add one or more annotations (otherwise referred to herein as "interface annotations") to the shared interface. The one or more interface annotations are then shared among other participating devices such that the participants in the discussion can view and quickly understand any point the annotator is attempting to convey. Various annotations are possible and can be modified to remain on the shared interface for a selected period of time. For instance, the interface annotations may remain on the shared interface for a period of seconds or minutes and then be removed without user intervention. Beneficially, this may allow the presentation of the shared document to continue without the interface annotation carrying over to unrelated discussions or becoming distracting for subsequent discussion. The interface annotations can have an ephemeral nature in some embodiments while in others, the interface annotations may be built upon with other interface annotations thereby allowing for collaboration of ideas by various participants. Further, in some embodiments, the interface annotations may be made permanent and/or recorded for future replay of the discussion. For instance, in some embodiments, such as when a video call transcription is enabled, the interface annotation may be reproduced upon playback of a transcribed video. The interface annotations may be reproduced at the point in time the original interface annotations were shared and remain on the shared interface for the period of time for which the original interface annotations were displayed.

In some embodiments, the interface annotations may be tagged or otherwise designated as being created by certain participating devices. For instance, an interface annotation may be a distinct color to indicate that a certain participating device created the respective interface annotation. In some embodiments, the interface annotation may have a tag that identifies the participating device which created the interface annotation (e.g., the tag may include an ASCII text, a pointer, a memory address, emoji, avatar, etc. that identifies the user via the participating device who created the interface annotation).

In some embodiments, one or more users may have the ability to disable the ability of certain participating devices to create interface annotations. The ability of individual participating devices to create interface annotations may be disabled and may be enabled.

In some embodiments, custom emojis may be stamped on the interface.

In some embodiments, an interface annotation may be smoothed to result in a cleaner, more aesthetically pleasing interface annotation.

In some embodiments, the interface annotations are created on a designated layer of the shared interface. The designated layer can then be transmitted along with the rest of the shared interface to participating devices or can be selectively withheld from being transmitted with the rest of the shared interface. For instance, in some embodiments, sharing a shared interface may result in a double rendering of the interface annotation. The resulting image may appear blurred, offset, or otherwise insufficient. By selectively withholding the designated layer that the interface annotation is associated with, the inventors have found that double rendering of the interface annotation can be avoided. In addition, having the interface annotation associated with a designated layer of the shared interface can allow for identification of the interface annotation and association of the interface annotation with a select participating device. In such embodiments, other participating devices can quickly recognize which participating device created the interface annotation. Such information can help further develop and advance the discussion.

The group-based communication interface provides systems and methods for allowing participants in a discussion to interact in the discussion visually thereby allowing the participants to more clearly and efficiently explain their point of view or point of discussion. The group-based communication interface allows an interface to be shared among participating devices and allows the participating devices to annotate the interface simultaneously such that sharing does not need to be disconnected/reconnected to transfer control of annotations among devices and the viewed documents do not need to be separately transmitted among devices. Further, visually illustrating a point a user is trying to convey may be more efficient than trying to verbally explain the point; thus, the group-based communication interface may allow for shorter discussions. The group-based communication interface thereby reduces the system resources, improving the life of the devices, and thereby provides an efficient and effective method to allow the creation and display of annotations and documents among devices. The group-based communication interface thereby provides an interface for group-based communications rooted in computer technology in order to overcome a problem specifically arising in the realm of computer networks.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and external applications. The supporting servers comprise, among other components, a messaging communication server, a validation server, a user account database, an analytical engine, and the like.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications), in some embodiments, will be displayed to each member of the group-based communication channel. For instance, a common set of group-based messaging communications may be displayed to each member of the respective group-based communication channel such that the content of the group-based communication channel (i.e., messaging communications) does not vary per member of the group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages and/or interface annotations that are sent by a particular user (via a client device associated with the particular user). These messages and/or interface annotations may be analyzed to determine context regarding the user (e.g., the user's expertise or interest in a topic may be determined based on the frequency of mention of the topic or key-words associated with the topic within such messages and/or interface annotations).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "interface annotation" refers to a visual marking applied virtually to a graphic user interface, such as a group-based communication interface. The visual marking may be used by participating users of a group-based communication interface to highlight, emphasize, modify, illustrate, or otherwise bring to the attention of other participating users some portion of the graphic user interface. In the group-based communication interface of the present disclosure, the interface annotations are applied to a designated layer of the group-based communication interface and can be shared among participating devices on a shared interface.

A "shared interface" refers to a portion of a group-based communication interface that is shared among participating devices of a group-based communication system. The shared interface is a portion of the group-based communication interface configured for display on the interface sharing device that can then be shared among participating devices. The contents of the shared interface may vary over time as the interface sharing devices modifies/changes the portion of the group-based communication interface configured for display on the interface sharing device. The interface may vary among participating devices as to certain qualities or aspects of the interface, however, the information conveyed by the interface will generally be rendered on a display of each participating device. That is, the protocol for sending the shared interface to each participating device may vary among participating devices as well as the format, size, etc. of the resulting interface; however, the content will generally be consistent among participating devices. In some embodiments, interface annotations may be designated for certain participating devices among a plurality of participating devices. In such embodiments, except for the select interface annotations affected, the content will generally be consistent among participating devices.

The term "participating device" or "participant device" refers to a client device configured and authenticated for communication with the group-based communication system and interaction with a group-based communication interface. When an interface is shared among devices participating in a discussion/call/meeting, the client device from which the interface is shared may be referred to as the "interface sharing device" and each of the client devices participating in the discussion/call/meeting and receiving the shared interface may be referred to as the participating device or participant device.

A "participating device identifier" refers to one or more items of data by which a participating device within a group-based communication system may be identified. For example, a participating device identifier may comprise ASCII text, a pointer, a memory address, and the like.

The term "annotating device" refers to the participating device that creates the interface annotation. That is, the annotating device is respective to the particular interface annotation. In general, each of the participating devices can be an annotating device.

The term "display input data" refers to the items of data associated with the interface annotation and that can be used to create interface annotation instructions for rendering of the interface annotation on one or more interfaces of the group-based communication system. The display input data may include coordinates for markings or portions of the associated interface annotation and/or participating device identifiers. "Interface annotation instructions" refers to items of data that can be transmitted to other client devices and/or to a back-end server and/or stored on a client device and/or back-end server and provide guidelines or directions and/or relevant identifiers for rendering the associated interface annotation. In some embodiments, the interface annotation instructions may comprise coordinates for virtual markings or portions of the associated interface annotation and participating device identifiers.

As used herein, "intended set of display input data" refers to display input data that is generated based on the received display input data. Interface annotation instructions are then based on the intended set of display input data in place of or in addition to the received display input data. As used herein, "a higher quality, clarity, or aesthetic appearance" (e.g., cleaner or smoother lines/shapes/images) may result from the intended set of display input data. The intended set of display input data may result in smoother lines, cleaner shapes, etc. as compared to the interface annotations that would otherwise result from the display input data alone. The circuitry described herein may include instructions that relate a set of display input data or display input data falling within defined parameters with intended set of display input data such that when the set of display input data is received, the intended set of display input data may be generated and used to generate the interface annotation instructions. In some embodiments, an intended set of display input data may be generated when an algorithm is performed based on the received display input data and determines that intended set of display input data is needed. For instance, an algorithm may determine that the display input data would result in a misshapen circle or jagged edge. The circuitry disclosed herein would then generate an intended set of display data that would result in interface annotations for a symmetrical circle or smooth edge. In some embodiments, machine learning models may be used to generate the interface annotations. The term "machine learning model" refers to a computer application that employs an algorithm to build a model from sample inputs. The machine learning model can make predictions or decisions based on input data. For instance, programmatically expected interface annotations may be generated based on display input data. For example, display input data may be received and using machine learning models, predicted interface annotations may be generated. Predicted interface annotations refers to programmatically generated interface annotations with an expected likelihood that the associated display input data will result or is intended to result in the predicted interface annotations. For instance, as display input data that includes coordinates for the start of a circle are received, machine learning models may determine that a circle is intended and complete the display input data such that a circle interface annotation is generated without receiving the complete set of display input data for a circle.

The term "time of receipt" refers to timestamps defined by a computer, server, or communications network. A timestamp is a sequence of characters or encoded information identifying when a certain event (e.g., an interface annotation) occurred, usually giving date and time of day, sometimes accurate to a small fraction of a second. For example, display input data may comprise a timestamp that tells when an associated interface annotation was created or last modified.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107. Client devices 101A-101N may interact peer-to-peer or may interact through group-based communication server 106 and group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 902.11, 902.16, 902.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit shared interfaces, interface annotations, interface annotation instructions, display input data, etc. provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of shared interfaces, interface annotations, interface annotation instructions, display input data, etc. organized within the group-based communication repository 107.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, interface annotation instructions may be sent from a client device 101A-101N to a group-based communication system 105. In various implementations, the interface annotation instructions may be sent to the group-based communication system 105 over communications network 104 directly by a client device 101A-101N, the interface annotation instructions may be sent to the group-based communication system 105 via an intermediary such as an intermediate server or another client device 101A-101N, and/or the like. For example, the client device 101A-101N may be a desktop, a laptop, a tablet, a smartphone, and/or the like that is executing a client application (e.g., a group-based communication app). In one implementation, the interface annotation instructions may include data such as a participating device identifier, sending user identifier, a group identifier, a group-based communication channel identifier, annotation coordinates (e.g., text, highlights, underlines, emojis, images, links, or other markings), attachments (e.g., files), annotation hierarchy data (e.g., the interface annotation may be linked to another interface annotation), third party metadata, and/or the like. In one embodiment, the client device 101A-101N may provide interface annotation instructions, substantially in the form of a (Secure) Hypertext Transfer Protocol ("HTTP(S)") POST message including eXtensible Markup Language ("XML") formatted data.

The group-based communication system 105 comprises at least one group-based communication server 106 that may create a storage interface annotation instructions based upon the display input data to facilitate indexing and storage in a group-based communication repository 107. In one implementation, the storage interface annotation instructions may include data such as a participating device identifier, a group identifier, a group-based communication channel identifier, a sending user identifier, topics, responses, annotation coordinates, attachments, annotation hierarchy data, third party metadata, conversation primitive data, and/or the like. For example, the group-based communication server 106 may provide storage interface annotation instructions, substantially in the form of a HTTP(S) POST message including XML-formatted data.

In embodiments, a group identifier as defined above may be associated with the interface annotation.

In embodiments, a group-based communication channel identifier as defined above may be associated with the interface annotation.

In embodiments, a participating device identifier as defined above may be associated with the interface annotation. In one implementation, the interface annotation instructions may be parsed (e.g., using PHP commands) to determine a participating device identifier of the device from which the interface annotation originated.

In embodiments, topics may be associated with the interface annotation. In one implementation, the interface annotation instructions may be parsed (e.g., using PHP commands) to determine topics associated the interface annotation. In another example, the interface annotation instructions may be analyzed (e.g., by itself, with other interface annotation instructions) or parsed using a machine learning technique, such as topic modeling, to determine topics associated with the interface annotation.

In embodiments, data indicating responses may be associated with the interface annotation. For example, responses to the interface annotation by other users may include reactions (e.g., selection of an emoji associated with the interface annotation, selection of a "like" button associated with the interface annotation), clicking on a hyperlink embedded in the interface annotation, replying to the interface annotation (e.g., adding an interface annotation to the shared interface in response to the interface annotation), downloading a file associated with the interface annotation, sharing the interface annotation from one group-based communication channel to another group-based communication channel, pinning the interface annotation, starring the interface annotation, and/or the like. In one implementation, data regarding responses to the interface annotation by other users may be included with the interface annotation, and the interface annotation may be parsed (e.g., using PHP commands) to determine the responses. In another implementation, data regarding responses to the interface annotation may be retrieved from a database. For example, data regarding responses to the message may be retrieved via a MySQL database command.

For example, data regarding responses to the interface annotation may be used to determine context for the interface annotation (e.g., a social score for the interface annotation from the perspective of some user). In another example, data regarding responses to the interface annotation may be analyzed to determine context regarding the user (e.g., the user's expertise in a topic may be determined based on the responses to the user's interface annotation regarding the topic).

In embodiments, attachments may be included with the interface annotation. If there are attachments, files may be associated with the interface annotation instructions. In one implementation, the interface annotation instructions may be parsed (e.g., using PHP commands) to determine file names of the attachments. For example, file contents may be analyzed to determine context for the interface annotation instructions (e.g., a patent policy document may indicate that the interface annotation instructions is associated with the topic "patents").

In embodiments, third party metadata may be associated with the interface annotation. For example, third party metadata may provide additional context regarding the interface annotation or the user that is specific to a company, group, group-based communication channel, and/or the like. In one implementation, the interface annotation instructions may be parsed (e.g., using PHP commands) to determine third party metadata. For example, third party metadata may indicate whether the user who sent the interface annotation instructions is an authorized representative of the group-based communication interface (e.g., an authorized representative may be authorized by the company to respond to questions in the group-based communication system).

In embodiments, a conversation primitive may be associated with the interface annotation instructions. In one implementation, a conversation primitive is an element used to analyze, index, store, and/or the like an interface annotation. For example, the interface annotation (and/or interface annotation instructions) may be analyzed by itself, and may form its own conversation primitive. In another example, the interface annotation instructions may be analyzed along with other interface annotation instructions, and the interface annotations that make up the discussion may form a conversation primitive. In one implementation, the conversation primitive may be determined as the interface annotation instructions, a specified number (e.g., two) of preceding interface annotation instructions and a specified number (e.g., two) of following interface annotation instructions. In another implementation, the conversation primitive may be determined based on analysis of topics discussed in the discussion and other interface annotations (e.g., in the discussion) and/or proximity (e.g., interface annotation send order proximity, interface annotation send time proximity) of these interface annotations.

In embodiments, various metadata, determined as described above, and/or the contents of the interface annotation instructions may be used to index the interface annotation (e.g., using the conversation primitive) to facilitate various facets of searching (i.e., search queries that return results from group-based communication repository 107). In one implementation, a storage interface annotation may be sent from group-based communication server 106 to facilitate indexing in group-based communication repository 107. In another implementation, metadata associated with the interface annotation may be determined and the interface annotation may be indexed in group-based communication repository 107. In one embodiment, the interface annotation may be indexed such that a company's or a group's interface annotation are indexed separately (e.g., in a separate index associated with the group and/or company that is not shared with other groups and/or companies). In one implementation, interface annotation may be indexed at a separate distributed repository (e.g., to facilitate data isolation for security purposes).

If there are attachments associated with the interface annotation, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The client devices 101A-101N and/or group-based communication server 106 may be embodied by one or more computing systems and include one or more components shown in circuitry 200 shown in FIG. 2. The circuitry 200 may include a processor 202, a memory 201, input/output circuitry 203, and communications circuitry 205. The circuitry 200 may, in some embodiments, also include group-based communication repository 107 and group-based communication circuitry 204, and in some embodiments, the circuitry 200 may include shared interface rendering module 206 and shared interface repository 207. The circuitry 200 may be configured to execute the operations described above with respect to FIG. 1 and below with respect to FIGS. 9-11. Although these components 107 and 201-207 are described with respect to functional limitations, it should be understood that the particular implementations necessarily include the use of particular hardware. It should also be understood that certain of these components 107 and 201-207 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the circuitry 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the circuitry 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the circuitry 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

One or more of processor 202, group-based communication circuitry 204, and shared interface rendering module 206 may control and direct the creation and sharing of interface annotations, such as the operations discussed with regards to FIGS. 9-11. For instance in some embodiments, the shared interface rendering module 206 may receive interface annotations associated with display input data, process the data, and generate interface annotation instructions for then transmitting to participating devices. The shared interface rendering module 206 may associate intended display input data with the display input data and then, based on both, generate interface annotation instructions for subsequent rendering of the respective interface annotation. In some embodiments, the shared interface rendering module 206 may receive the display input data, associate the display input data with a designated layer associated with the annotating device (the participating device which created the interface annotation), and generate interface annotation instructions associated with the designated layer for rendering on participating devices. The shared interface rendering module 206 may control and direct any of the operations discussed with regards to FIGS. 9-11. The shared interface rendering module 206 may be divided over a number of devices where certain operations occur on one or more of the devices. The shared interface rendering module 206 may store interface annotations, display input data, intended display input data, interface annotations instructions, and the like to support the operations of the shared interface rendering module 206 and the remaining circuitry 200 via shared interface repository 207. In some embodiments, the shared interface rendering module 206 may interact with group-based communication repository 107, shared interface repository 207, and/or memory 201 to retrieve and/or store interface annotations, display input data, intended display input data, interface annotations instructions, and the like to support the operations of the shared interface rendering module 206 and the remaining circuitry 200.

Example Methods and Systems for Sharing Interface Annotations Within the Group-Based Communication Network FIG. 3 illustrates an exemplary system for sharing interface annotations according to one embodiment of the present disclosure. In particular, FIG. 3 illustrates a system 300 comprising a plurality of participating devices 301a-301d interacting with an interface sharing device 302. As shown in FIG. 3, in some embodiments, a participating device, such as 301d, can create an interface annotation, such as 304a, that is then shared among the other participating devices via the interface sharing device, such as 302. In the embodiment illustrated in FIG. 3, participating device 301d created an interface annotation 304a (thereby becoming the annotating device with respect to the interface annotation 304a) that is then transmitted to interface sharing device 302. In some embodiments, display input data associated with the interface annotation 304a is transmitted to the interface sharing device 302. The interface sharing device 302 includes the shared interface which comprises a series of layers 303a-303d. The received interface annotation 304a via the display input data is associated with designated layer 303d associated with respective annotating device 301d. The interface sharing device 302 renders the interface annotation 304b on the display of the interface sharing device 302 as part of the shared interface and transmits interface annotation instructions to each of the participating devices for rendering of the interface annotation 304c on the respective displays of the participating devices. Each of the participating devices 301a-301d can create interface annotations and share the annotations via the interface sharing device 302 to the other participating devices 301a-301d.

FIG. 4 illustrates an exemplary shared interface according to one embodiment of the present disclosure. In the embodiment illustrated in FIG. 4, the shared interface 400 is shown on a participating device. At least one participating device has added an interface annotation 402 to the shared interface 400. As shown in FIG. 4, the interface annotation 402 is a highlighted underline pointing to a certain heading for discussion. The interface annotation may include a variety of shapes, colors, sizes, and can be free-hand drawing, images pasted/clipped to the shared interface (e.g., emojis, such as custom emojis), and the like. As shown in FIG. 4, with the use of the interface annotation 402, each participating device in receipt of the associated interface annotation instructions is able to view the interface annotation 402 and can thus efficiently and effectively follow the discussion at hand. In some embodiments, only certain participating devices may receive the interface annotation instructions thereby only those certain participating devices may view the interface annotation.

The interface annotation may be configured as an ephemeral image that disappears from view after a certain amount of time. For example, the interface annotation instructions may include instructions to render the interface annotation for a certain amount of time, e.g., 3 seconds, 5 seconds, 1 minutes, etc. and then remove the interface annotation from the shared interface. In other embodiments, the interface annotation instructions may include instructions to render the interface annotation for a certain amount of time along with another interface annotation. That is, two or more interface annotations may be linked together to be rendered together for the same amount of time or adjoining periods of time.

FIG. 5 illustrates an exemplary shared interface according to one embodiment of the present disclosure. In the embodiment illustrated in FIG. 5, the shared interface 500 is shown on a participating device. At least one participating device has added an interface annotation 502 to the shared interface 500. As shown in FIG. 5, the interface annotation 502 is a circle. The circle may be drawn by hand (e.g., via a mouse or touch screen) or may be drawn by selecting a circle image to insert. Various shapes and configurations are possible for annotating the shared interface.

In some embodiments, the interface annotation may be colored or tagged in a manner to indicate the participating device from which the interface annotation originated. For instance, the interface annotation may be red for one participating device, yellow for another participating device, green for another participating device, etc. In some embodiments, a tag may be generated and displayed along with the interface annotations that includes a participating device identifier. In some embodiments, the tag may appear when a user scrolls over the interface annotation and may disappear after a period of time the same or different than the interface annotation. As multiple participating device may render the interface annotation, by tagging or identifying the participating device from which the annotation originated, each participating device is able to readily see who (via the participating device) added the interface annotation.

In some embodiments, the interface annotation instructions may include a participating device identifier that identifies the participating device from which the interface annotation originated. Participating devices in receipt of the interface annotation instructions are then able to identify the participating device from which the interface annotation originated by an appropriate color or similar tag (e.g., an emoji). In some embodiments, each participating device may be associated with a respective layer of the shared interface such that the layer of the shared interface itself becomes indicative of the participating device from which the interface annotation originated.

FIG. 6 illustrates an exemplary shared interface according to one embodiment of the present disclosure. In the embodiment illustrated in FIG. 6, the shared interface 600 is shown on a participating device. The participating device has added an interface annotation 602 to the shared interface 600 on the shared document 601 (i.e., a schematic of a guitar). As shown in FIG. 6, the interface annotation 602 is a circle manually drawn (e.g., via a mouse or touch screen) and thus, has rather jagged edges. Various possibilities for annotations are available by manually drawing the interface annotations. In the embodiment illustrated in FIG. 6, a user via the participating device uses the interface annotation 602 to draw attention to a certain area of the shared document 601. Each participating device in receipt of the associated interface annotation instructions is able to view and readily recognize to which portion of the shared document 601 the user is drawing attention.

FIG. 7 illustrates an exemplary shared interface according to one embodiment of the present disclosure. In the embodiment illustrated in FIG. 7, the shared interface 700 is shown on a different participating device than the participating device shown in FIG. 6. In the embodiment illustrated in FIG. 7, the display input data associated with the interface annotation 602 has been associated with intended display input data. Both the original display input data and the intended display input data are used to generate the interface annotation instructions that are then sent to other participating devices, such as the participating device illustrated in FIG. 7. The intended display input data may also be used to correct or adjust the interface annotation on the originating participating device. The intended display input data is programed to smooth lines or shapes such that the drawn images, shapes, words, etc. are made clearer or more aesthetically pleasing. In some embodiments, such "smoothing" may not be used or may be turned off. However, such "smoothing" may be used in some embodiments where it is desired to create a more professional image. As shown in FIG. 7, the resulting interface annotation 703 has a smoother finish and more professional appearance due to the correlation to intended display input data and the use of such to formulate the interface annotation instructions.

In addition, in the embodiment illustrated in FIG. 7, another participating device has added interface annotation 704 and another participating device has added interface annotation 705. As shown in FIG. 7, each of the interface annotations are distinguishable such that the respective participating device which originated the interface annotation can be easily recognized and identified. In addition, as shown in FIG. 7, each of the interface annotations appear together on the shared interface 700. In some embodiments, time limits may be established such that if additional interface annotations are added to a shared interface within those time limits, the interface annotations will be linked and appear together on the shared interface. The system may be programed such that the addition of each subsequent interface annotation resets the time limit to allow for subsequent interface annotations to be added and thereby linked to the previous interface annotations. For instance, in the embodiment illustrated in FIG. 7, additional users (via respective participating devices) added interface annotations 704 and 705 to show additional details they wish to add to the schematic of the guitar.

In the embodiment illustrated in FIG. 7, emoji 706 and emoji 707 have been added to the shared screen. The emoji 706 is a gavel and may have been added to show that a decision has been made for the design of the guitar (shown in the shared document 701). The emoji 707 may have been added to show which user added the emoji 706 or to merely show approval by the user identified in the emoji 707. Such emojis may be added to the shared interface and thereby shown to any participating device in receipt of the respective interface annotation instructions to advance the relevant discussion. The emojis may be added through any of the aforementioned annotation tools. Custom emojis may be added to the shared interface. Various alternative configurations are possible without deviating from the intent of the present disclosure.

FIG. 8 illustrates a menu that may appear on a group-based communication interface according to one embodiment of the present disclosure. The menu 800 may be a pop-up menu, a menu selected from a list, or a menu that otherwise appears in the interface for the user to interact. As shown in FIG. 8, in the illustrated embodiment, the menu provides the user the opportunity to allow one or more users (via participating devices) to add interface annotations (referred to as "draw" in FIG. 8) on the shared interface. The ability to add interface annotations may be enabled (803) or disabled (802). For example, in some embodiments, circuitry 200 may receive a signal indicating that one or more participating devices may have an enable flag associated with the device (enabling interface annotations) or a disable flag associated with the device (disabling interface annotations). The menu also may be specific to a user such that the ability to add interface annotations may be turned on/off specifically with regards to that user. For example, in FIG. 8, the user speaking is distinguished (801). The ability of that user to add interface annotations may be turned on or off. Various alternative configurations are possible without deviating from the intent of the present disclosure.

FIG. 9 is a flowchart illustrating operations that are executed by an exemplary group-based communication system for sharing interface annotations according to one embodiment of the present disclosure. In the embodiment illustrated in FIG. 9, the flowchart illustrates method 900 which includes causing the shared interface to be rendered on displays of participating devices 901, receiving display input data from participating devices 902, generating interface annotation instructions based on the display input data 903, and outputting interface annotation instructions to the participating devices 904. In some embodiments, causing the shared interface to be rendered on displays of participating devices comprises transmitting a shared interface to participating devices where the shared interface can be displayed on the device. The shared interface may comprise various layers of information for processing and displaying as the shared interface. In some embodiments, the transmission of the shared interface may vary based on the transmitting device and/or on the receiving device. Generally, the information for display on the shared interface will be consistent among devices to which the shared interface is shared or at least the resulting display is generally consistent among devices to which the shared interface is shared (e.g., in embodiments where double rendering is avoided, the resulting display is generally consistent even though the originating participating device may not receive all of the layers of the shared interface).

In some embodiments, a user via a participating device may add an interface annotation to the shared interface via an annotation device (e.g., mouse, keyboard, cursor, touch screen, etc.). The interface annotation generates display input data associated with the interface annotation. The display input data may be transmitted from the participating device that originated the interface annotation and received by the interface sharing device. The display input data may be associated with a designated layer of the shared interface and used to generate interface annotation instructions. In some embodiments, by associating the interface annotation and display input data with a designated layer of the shared interface, the interface annotation can be distinguished as an interface annotation and/or by participating device. For instance, each participating device may have a respective layer of the shared interface that an interface annotation is attached. Transmission of the display input data then identifies the participating device since the display input data is associated with the layer and the layer is associated with the participating device.

In some embodiments, by associating the interface annotation and display input data with a designated layer of the shared interface, transmission of the resulting interface annotation instructions can be controlled. That is, depending on the layer of the shared interface on which the interface annotation is associated, the interface annotation instructions can be generated to avoid the participating device from which the interface annotation originated. In some instances, an interface annotation may originate on a participating device, be sent to an interface sharing device, and then sent out to participating devices. In such cases, the participating device which originated the interface annotation may receive a double rendering of the interface annotation. In some cases, the double rendering may be indecipherable such that a user cannot distinguish the original interface annotation from the second rendering of the interface annotation. However, in some embodiments, such double rendering creates a blurry, offset, or otherwise inadequate rendering of the interface annotation. To avoid such double rendering, the interface annotation instructions may be directed to certain participating devices while avoiding other participating devices, such as the participating device from which the interface annotation originated.

In some embodiments, the interface annotation instructions may be transmitted to certain participating devices, as directed by the interface annotation and the display input data, rather than other participating devices regardless of the origin of the interface annotation.

In some embodiments, multiple interface annotations may be created generating multiple sets of display input data and multiple interface annotations may be created simultaneously generating multiple sets of display input data. Respective interface annotation instructions may be generated and then outputted to the appropriate participating devices in the group-based communication system. In some embodiments, subsequent interface annotations may be added to the shared interface within a predetermined period of time such that the adjacent interface annotations are linked and appear together on the shared interface. Further, in some embodiments, a time of receipt may be recorded for each interface annotation such that the interface annotation may be stored and later replayed along with the recorded discussion. For instance, when the recorded discussion is replayed, the interface annotation may be displayed at the same time during the discussion in which the interface annotation was originally shared and be displayed for the same period of time in which the interface annotation was originally shared.

Further in some embodiments, the method 900 may include associating the display input data with intended display input data and generating interface annotation instructions based on the intended set of display input data and the original display input data. FIG. 10 is a flowchart illustrating operations that are executed by an exemplary group-based communication system for sharing interface annotations according to one embodiment of the present disclosure. The method 1000 may be incorporated into the method of 900 in some embodiments. In the embodiment illustrated in FIG. 10, the method 1000 includes associating the display input data with intended display input data 1001 and generating interface annotation instructions 1002. The intended display input data may result in an interface annotation rendered with higher quality, clarity, or otherwise improved aesthetic appearance than the interface annotation without the intended display input data. The intended display input data may be stored in the circuitry 200 and by way of various algorithms associated with the original display input data.

FIG. 11 is a flowchart illustrating operations that are executed by an exemplary group-based communication system for sharing interface annotations according to one embodiment of the present disclosure. In the embodiment illustrated in FIG. 11, the flowchart illustrates method 1100 which includes receiving a shared interface 1101, creating an interface annotation, thereby generating display input data 1102, and causing the display input data to be transmitted to the interface sharing device 1103. The method 1100 may be performed by one or more participating devices in the group-based communication system.

In some embodiments, as an interface annotation is created, machine-learning tools may be used to predict and/or finish the interface annotation (e.g., finish drawing the circle, square, etc.). In some embodiments, as an interface annotation is created, machine-learning tools may be used to prevent the completion of an interface annotation (e.g., where the interface annotation is likely to be found inappropriate for the discussion).

In some embodiments, the interface sharing device may include an annotation device to add/create interface annotations. That is, in some embodiments, similar to how participating device may create interface annotations that are then shared on the shared interface, the interface sharing device may create interface annotations on the shared interface that are then shared with the participating devices on the shared interface.

In some embodiments, a participating device may cancel an interface annotation. That is, prior to interface annotation instructions being sent to participating devices, an originating participating device may cancel the interface annotation.

ADDITIONAL IMPLEMENTATION DETAILS

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for sharing annotations in a group-based communication interface, comprising:
   transmitting an indication of a content item for display at a plurality of devices viewing the group-based communication interface;
   receiving a drawing annotation of the content item;
   transmitting an indication of the drawing annotation for display at the plurality of devices viewing the group-based communication interface;
   receiving a reactive emoji associated with the drawing annotation of the content item, wherein the drawing annotation and the reactive emoji are received from different devices; and
   transmitting an indication of the reactive emoji for display at the plurality of devices viewing the group-based communication interface, wherein the reactive emoji is displayed in association with the content item and the drawing annotation.

2. The method of claim 1, wherein the reactive emoji is a pre-defined emoji.

3. The method of claim 1, wherein the reactive emoji is a custom emoji.

4. The method of claim 1, further comprising:
   displaying an association between the reactive emoji and a device that selected the reactive emoji.

5. The method of claim 1, wherein the reactive emoji is a first reactive emoji, the method further comprising:
   receiving, from a device of the plurality of devices viewing the group-based communication interface, a second reactive emoji associated with one or both of the content item or the drawing annotation; and
   transmitting an indication of the second reactive emoji for display at the plurality of devices viewing the group-based communication interface.

6. The method of claim 5, wherein the first reactive emoji and the second reactive emoji are simultaneously displayed in the group-based communication interface.

7. The method of claim 1, further comprising:
   modifying at least a portion of the drawing annotation before displaying the drawing annotation in the group-based communication interface.

8. The method of claim 1, wherein the drawing annotation comprises an emoji, an image, an illustration, a highlight, an underline, a shape, a free-hand drawing, or a combination thereof.

9. The method of claim 1, further comprising:
   transmitting, for display in the group-based communication interface, an indication that a first user associated with a first device has permission to annotate the group-based communication interface.

10. The method of claim 9, further comprising:
    transmitting, for display at a second device associated with an administrator of the group-based communication interface, an option to remove the permission to annotate the group-based communication interface from the first user.

11. An apparatus for sharing annotations in a group-based communication interface, comprising:
    one or more processors;
    a memory; and
    instructions stored in the memory and executable by the one or more processors to cause the apparatus to:
       transmit an indication of a content item for display at a plurality of devices viewing the group-based communication interface;
       receive a drawing annotation of the content item;
       transmit an indication of the drawing annotation for display at the plurality of devices viewing the group-based communication interface;
       receive a reactive emoji associated with the drawing annotation of the content item, wherein the drawing annotation and the reactive emoji are received from different devices; and
       transmit an indication of the reactive emoji for display at the plurality of devices viewing the group-based communication interface, wherein the reactive emoji is displayed in association with the content item and the drawing annotation.

12. The device apparatus of claim 11, wherein the reactive emoji is a first reactive emoji and the instructions are further executable by the one or more processors to cause the apparatus to:
    receive, from a device of the plurality of devices viewing the group-based communication interface, a second reactive emoji associated with one or both of the content item or the drawing annotation; and
    transmit an indication of the second reactive emoji for display at the plurality of devices viewing the group-based communication interface.

13. The apparatus of claim 11, wherein the instructions are further executable by the one or more processors to cause the apparatus to:
- modify at least a portion of the drawing annotation before displaying the drawing annotation in the group-based communication interface.

14. A non-transitory computer-readable storage medium storing instructions for sharing annotations in a group-based communication interface, wherein the instructions are executable by one or more processors to:
- transmit an indication of a content item for display at a plurality of devices viewing the group-based communication interface;
- receive a drawing annotation of the content item;
- transmit an indication of the drawing annotation for display at the plurality of devices viewing the group-based communication interface;
- receive a reactive emoji associated with the drawing annotation of the content item, wherein the drawing annotation and the reactive emoji are received from different devices; and
- transmit an indication of the reactive emoji for display at the plurality of devices viewing the group-based communication interface, wherein the reactive emoji is displayed in association with the content item and the drawing annotation.

15. The non-transitory computer-readable storage medium of claim 14, wherein the reactive emoji is a first reactive emoji and the instructions are further executable by the one or more processors to:
- receive, from a device of the plurality of devices viewing the group-based communication interface, a second reactive emoji associated with one or both of the content item or the drawing annotation; and
- transmit an indication of the second reactive emoji for display at the plurality of devices viewing the group-based communication interface.

16. The non-transitory computer-readable storage medium of claim 14, wherein the instructions are further executable by the one or more processors to:
- modify at least a portion of the drawing annotation before displaying the drawing annotation in the group-based communication interface.

17. The method of claim 1, further comprising:
- receiving an indication to disable annotations for the group-based communication interface; and
- removing the drawing annotation and the reactive emoji from the group-based communication interface in response to the indication.

* * * * *